US010063628B2

(12) United States Patent
Krueger (10) Patent No.: US 10,063,628 B2
(45) Date of Patent: Aug. 28, 2018

(54) DEVICE AND METHOD FOR PROVIDING MULTIMEDIA DATA IN A MOTOR VEHICLE

(71) Applicant: Volkswagen Aktiengesellschaft, Wolfsburg (DE)

(72) Inventor: Martin Krueger, Isenbuettel (DE)

(73) Assignee: VOLKSWAGEN AG, Wolfsburg (DE)

( * ) Notice: Subject to any disclaimer, the term of this patent is extended or adjusted under 35 U.S.C. 154(b) by 168 days.

(21) Appl. No.: 14/696,851

(22) Filed: Apr. 27, 2015

(65) Prior Publication Data

US 2015/0229711 A1 Aug. 13, 2015

Related U.S. Application Data

(63) Continuation of application No. PCT/EP2013/070026, filed on Sep. 26, 2013.

(30) Foreign Application Priority Data

Oct. 25, 2012 (DE) .......................... 10 2012 020 974

(51) Int. Cl.
*H04L 29/08* (2006.01)
*G06F 17/22* (2006.01)
(Continued)

(52) U.S. Cl.
CPC .............. *H04L 67/10* (2013.01); *G06F 9/451* (2018.02); *G06F 17/2247* (2013.01);
(Continued)

(58) Field of Classification Search
CPC ......... H04L 67/10; H04L 67/02; H04L 67/12; G06F 17/2247; G06F 9/4443; G06F 9/451; H04W 4/003; H04W 4/60
See application file for complete search history.

(56) References Cited

U.S. PATENT DOCUMENTS 8,028,057 B2 9/2011 David
2011/0093137 A1* 4/2011 Moinzadeh ............. B60R 25/00
701/2
(Continued)

FOREIGN PATENT DOCUMENTS

CN 1440017 A 9/2003
DE 10 2010 037 271 A1 2/2012
(Continued)

OTHER PUBLICATIONS

Jahnich et al., "Integrating Dynamic Load Balancing Strategies into the Car-Network," $4^{th}$ IEEE Int'l Symp. on Elec. Design, Test & Apps, pp. 435-440 (2008).
(Continued)

*Primary Examiner* — Christopher L Parry
*Assistant Examiner* — Soe M Hlaing
(74) *Attorney, Agent, or Firm* — Barnes & Thornburg LLP (57) ABSTRACT

A device for providing multimedia data in a motor vehicle. At least one vehicle-internal hardware component serves to provide a first runtime environment for supporting at least one computer program application on the vehicle-internal hardware component. An interface serves for communication with at least one vehicle-external hardware component, which provides a second runtime environment for supporting the computer program application on the vehicle-external hardware component. Furthermore, either the vehicle-internal hardware component or the vehicle-external hardware component is selectable for executing the computer program application.

20 Claims, 4 Drawing Sheets

(51) Int. Cl.
*G06F 9/451* (2018.01)
*H04W 4/60* (2018.01)

(52) U.S. Cl.
CPC .............. *H04L 67/02* (2013.01); *H04L 67/12* (2013.01); *H04W 4/60* (2018.02)

(56) References Cited

U.S. PATENT DOCUMENTS

| | | | | |
|---|---|---|---|---|
| 2011/0275358 | A1* | 11/2011 | Faenger | ............... H04W 8/24 455/420 |
| 2012/0242510 | A1* | 9/2012 | Choi | ............... G01C 21/3688 340/988 |
| 2013/0194068 | A1 | 8/2013 | Mönig et al. | |
| 2015/0229711 | A1 | 8/2015 | Krueger | |

FOREIGN PATENT DOCUMENTS

| | | |
|---|---|---|
| DE | 102012020974 A1 | 4/2014 |
| EP | 1 912 413 B1 | 1/2010 |
| KR | 1020060077954 A | 7/2006 |
| KR | 1020080083616 A | 9/2008 |
| KR | 1020110090428 A | 8/2011 |
| KR | 20120115827 A | 10/2012 |
| WO | WO 2008/124891 A1 | 10/2008 |
| WO | WO 2009/080076 A1 | 7/2009 |
| WO | WO 2010/144735 A2 | 12/2010 |
| WO | WO 2011/084963 A2 | 7/2011 |

OTHER PUBLICATIONS

Bose et al., "Morphing Smart-pohnes into Automotive Application Platforms," Computer, vol. 44, No. 5, pp. 53-61 (May 2011).
QNX Car 2.0 for EcoCAR 2, QNX Software Systems, http://community.freescale.com/serlet/JiveServlet/previewBody/96203-102-1-9168/QNX%20CAR%202%20for%20EcoCar.pdf, pp. 1-34 (Sep. 6, 2012).
Gryc et al., "Warum HTML5 die HM-Technologie der Zukunft ist," http://www.qnx.com/download/download/23790/qnx_html5_de.pdf, pp. 1-9 (Jul. 18, 2012).
QNX demos mobile app platform in cloud-connected Porsche; downloaded from https://www.cnet.com/news/qnx-demos-mobile-app-platform-in-cloud-connected-Porsche; Jan. 9, 2012.

\* cited by examiner

DEVICE AND METHOD FOR PROVIDING MULTIMEDIA DATA IN A MOTOR VEHICLE

This nonprovisional application is a continuation of International Application No. PCT/EP2013/070026, which was filed on Sep. 26, 2013, and which claims priority to German Patent Application No. 10 2012 020 974.6, which was filed in Germany on Oct. 25, 2012 and which are both herein incorporated by reference.

BACKGROUND OF THE INVENTION

Field of the Invention

The present invention relates to devices and methods for providing multimedia data in a motor vehicle (MV), as they can be used especially in infotainment systems.

Description of the Background Art

It is customary in modern motor vehicles to make information, such as, e.g., vehicle status information and entertainment, to be accessible over the same system of control and display elements. Such a system is called an infotainment system in common parlance. Infotainment systems of this type offer, for example, access to operation and vehicle displays, navigation with telemetry, chassis settings and service functions, mobile telephone and the Internet, audio/video, etc. Depending on the vehicle type and/or vehicle class, an infotainment system can comprise an instrument cluster permanently installed in a vehicle with appropriate display and control units, such as, e.g., a multifunction steering wheel. For example, the functionality of a navigation system and a mobile telephone, a radio/TV tuner, etc., can be combined into an instrument cluster of this type. Nevertheless, in other embodiments the individual components can also be realized by separate devices, which then communicate with one another but only to a limited extent, if at all.

Such infotainment systems made up of separate devices are described, for example, in Jahnich, I. et al.: "Integrating Dynamic Load Balancing Strategies into the Car-Network," 4$^{th}$ IEEE International Symposium on Electronic Design, Test and Applications, 2008, or Bose, R. et al.: "Morphing Smartphones into Automotive Application Platforms," Computer Vol. 44, May 2011, No. 5, pp. 53-61.

The disadvantages of the aforementioned permanently installed combination devices are, for example, that they cannot keep pace with the rapid development and product cycles in the telecommunication and Internet sectors. Thus, for example, navigation applications of permanently installed navigation devices after some time are no longer up-to-date both in regard to their ease of use and/or the timeliness of the map data being used. Audio and/or video playback functionalities after some time are likewise technically no longer up-to-date, so that it is possible that more recent audio or video formats are not supported by older MV infotainment systems and thus playback of more recent audio or video data is not possible.

Separate devices, such as, e.g., smartphones, are in fact often technically the most advanced, but they can be coupled only inadequately to permanently installed infotainment components, so that, for example, playback of external data on a permanently installed infotainment display or via permanently installed loudspeakers is not possible or only possible inadequately.

SUMMARY OF THE INVENTION

It is therefore an object of the present invention to improve a infotainment systems, particularly MV infotainment systems, in regard to their flexibility and currentness.

According to an exemplary embodiment of the present invention, an MV infotainment system can be realized as a distributed system with a plurality of different and distributed instances or system components. In this regard, "distributed" can mean not localized at one particular point, such as, e.g., the vehicle, but individual components or instances of the system or network may be located at different places, perhaps far removed from one another, for example, similar to distributed computer networks.

A first instance of the distributed infotainment system according to an exemplary embodiment is provided by vehicle-side or in-vehicle hardware and/or software components. At least one second instance of the distributed system is provided by off-vehicle hardware and/or software components. Here "in-vehicle" can mean permanently installed in the vehicle such as, e.g., a display in a center console of the vehicle. "Off-vehicle" can mean not permanently installed in the vehicle such as, e.g., a portable device, which can be easily brought into the vehicle and again be removed from it. The in-vehicle and off-vehicle hardware and/or software components communicate with one another via at least one interface.

According to an exemplary embodiment of the present invention, the distributed infotainment system, inter alia, can have one and the same computer program application, also called a widget or applet below, and can be executed by different instances or components of the distributed infotainment system. It is possible, therefore, to select whether the computer program application is executed by an in-vehicle hardware component of the infotainment system, or whether the computer program application or software component is to be executed by an off-vehicle hardware component of the infotainment system. Accordingly, data to be accessed by the infotainment system can also be stored either in- or off-vehicle.

An exemplary embodiment of the present invention enables a scalable infotainment system through the distributed system architecture, so that the type and/or number of computer program applications, which run on in-vehicle hardware components, can be matched to their capability. For example, a greater number of programs or more computationally intensive programs can be executed on high-performance in-vehicle hardware (e.g., in regard to processor and/or memory performance) than on resource-poor in-vehicle hardware. In the latter case, however, memory-intensive and/or computationally intensive applications can be executed on at least one second instance of the distributed system, namely, off-vehicle hardware, so that the applications are available to the user of the distributed infotainment system in this way and via the interface in the vehicle.

According to an embodiment of the present invention, a device for providing multimedia data in a motor vehicle is provided. The device can include at least one in-vehicle hardware or system component for providing a first runtime environment for supporting at least one computer program application on the at least one in-vehicle hardware component. Further, the device can include an interface to at least one off-vehicle hardware or system component, which provides a second runtime environment for supporting the at least one computer program application on the at least one off-vehicle hardware component. Further, a selector can be provided that is configured to select either the in-vehicle or off-vehicle hardware component for executing the at least one computer program application.

The at least one in-vehicle hardware component according to an exemplary embodiment can comprise a processor, permanently installed in the vehicle, and/or a data memory and/or a display device of an MV infotainment system. In contrast, the at least one off-vehicle hardware component can comprise a processor, not permanently installed in the vehicle, and/or a data memory and/or a display device of the MV infotainment system. The off-vehicle hardware component can therefore be a portable device such as, e.g., a smartphone, a tablet PC, a laptop computer, or the like. Likewise, the off-vehicle hardware component can be a web server, which provides a special online infotainment service. Regardless of the hardware platform on which the computer program application is executed, the result data obtained therefrom can be played back in the vehicle by means of the interface via the in-vehicle hardware component.

Hardware- or operating system-specific runtime environments on the different instance/components of the distributed infotainment system mediate between the computer program application (e.g., widget, applet, etc.) and the particular hardware or the particular operating system. This can mean that the first runtime environment mediates between the computer program application and a first operating system of the in-vehicle hardware component and that the second runtime environment mediates between the computer program application and a second operating system of the off-vehicle hardware component such as, e.g., a smartphone. As a result, the computer program application can be created independently of the different hardware components or operating systems and optionally copied or moved between the different components.

An exemplary embodiment of the present invention can allow the processor and/or memory performance of the in-vehicle infotainment system component to be made very flexible or scalable. Thus, in some exemplary embodiments, the in-vehicle hardware component can be made relatively low-performing, because in this case the at least one computer application such as, e.g., a so-called applet or widget, can be executed on the off-vehicle hardware component. The interface between the in-vehicle and off-vehicle component in this case requires only the result data, supplied by the externally running computer program application, e.g., decoded audio-video data or location information, and transmitted from the off-vehicle to the in-vehicle hardware component, in order to output them there (in the vehicle) via an in-vehicle output device (e.g., display, loudspeakers, etc.). As was already mentioned, the at least one off-vehicle hardware component can comprise, for example, a portable device with at least one processor and a data memory for executing the at least one computer program application such as, e.g., a laptop computer or smartphone. In addition or alternatively, the at least one off-vehicle hardware component can comprise an off-vehicle web server in order to be able to access data provided by the web server and/or applications of an Internet service via the interface from the vehicle.

Further, it can be decided whether one and the same application (app) of the MV infotainment system is executed either on the in-vehicle hardware or on the off-vehicle hardware. Irrespective of this, the data resulting from the application can be played back in-vehicle. Therefore, the hardware resources of a distributed network are utilized.

The infotainment device can have an in-vehicle central control and display device, from which applications to be executed by the distributed infotainment system can be operated and on which information provided by the application programs can be output. Because it does not matter in the exemplary embodiments whether a computer application is ultimately executed on the in-vehicle or off-vehicle hardware or system component, according to some exemplary embodiments, the interface can be configured to be able to transmit data, generated by a computer program application running on the off-vehicle hardware, to the in-vehicle hardware, so that the in-vehicle hardware can display or play back the received data. Such data can be, for example, audio or video data decoded on the off-vehicle hardware, likewise position data provided by navigation software running on the external hardware, which are then displayed by an in-vehicle display of the infotainment system. A user of the distributed infotainment system does not need to be concerned whether a currently running infotainment application is executed on the local or in-vehicle or off-vehicle hardware such as, e.g., a smartphone or a remote computer. The result is largely independent of this.

According to an exemplary embodiment, the device can be configured to receive a configuration setting from the off-vehicle hardware component via the interface, e.g., a web server. In this case, the configuration setting can have information on the at least one running computer program application and/or multimedia data to be played back. It is therefore possible to configure the distributed MV infotainment system, for example, via an online service. A user of the infotainment system can therefore specify the functional scope that his system is to have via an online service of this type. For example, he can specify a navigation application, an audio/video playback application, and a weather application as the computer program applications to be executed by his infotainment system. It is conceivable in this case that the configuration contains information on which application is to run on which hardware (internal or external). For example, it could be specified that the navigation software runs on the in-vehicle hardware, whereas a playback software is provided on a smartphone coupled to the vehicle via the interface. In general, many variants are conceivable in the selection of the hardware components or the assignment of application software to a hardware component. For example, the selector can be configured to select the in-vehicle hardware component when the hardware resources of the in-vehicle hardware are sufficient for executing the at least one computer program application. Otherwise, the off-vehicle hardware components such as, e.g., a smartphone and/or web server are selected. The selection can be made, for example, manually or be load-specific. If, therefore, for example, it is detected at the start of an application that the hardware resources of the in-vehicle hardware do not (any longer) suffice for its execution, the application can be started instead on the off-vehicle hardware (e.g., smartphone). It is also conceivable that the selection can be made manually by the user, for example, via a user interface of the infotainment system in the vehicle or via the online service. If it is determined, for example, that a smartphone coupled with the vehicle only has a limited battery life, thus an application software desired by the user can be started instead on the in-vehicle hardware of the distributed infotainment system. Also, an already running software, i.e., an active process, can be ported or migrated during its runtime from one hardware component to another hardware component of the distributed infotainment system.

The interface can be clearly definable by a framework or programming framework, such as, e.g., JavaScript, and thereby also assure a platform-independent executability. According to an exemplary embodiment, the interface can be provided by the first runtime environment and the at least one off-vehicle hardware component or by the second runtime environment. Various technologies can be used for the exchange of information between the different instances of the distributed infotainment system. For example, the interface can occur based on the Representational State Transfer (REST) programming paradigm and at least one standardized network protocol, such as, e.g., HTTP (Hypertext Transfer Protocol) and/or WebSocket. It is therefore possible to exchange applications and/or files, such as, e.g., music files, between the distributed system components via the interface.

The distributed infotainment system according to an exemplary embodiment of the present invention can require a connection or connectivity between the in-vehicle and off-vehicle hardware component. If there is no connectivity between the various system components of the distributed system, it may happen that the results of a computer program application in the vehicle or on the in-vehicle hardware component are not available when the computer program application runs on an off-vehicle component. For example, audio data stored on an external web server of a computer cloud (cloud) may not be able to be played back when a connection between the in-vehicle hardware component of the infotainment system and the web server is broken. For such a case, certain data of interest to a user can be stored locally in an in-vehicle data memory in order to be able to provide these data without connectivity as well, i.e., offline. According to an exemplary embodiment, the device therefore can have an in-vehicle data memory to copy multimedia data and/or application data from the off-vehicle hardware component into the in-vehicle data memory in the event of a lack of connectivity between the in-vehicle and off-vehicle hardware component.

According to an embodiment of the present invention, a motor vehicle with a device of the invention for providing multimedia data in the motor vehicle is also provided. In other words, a motor vehicle of this type can include a first in-vehicle hardware or system component of the distributed infotainment system of the invention. The in-vehicle hardware component can be used to provide a first runtime environment for supporting a computer program application on the in-vehicle hardware component. Further, the motor vehicle can include the interface to at least one other off-vehicle hardware or system component of the distributed infotainment system. This off-vehicle hardware component, according to an exemplary embodiment, can have, for example, a driver's smartphone available in the vehicle and/or a remote web server for providing data and/or services from the Internet cloud. The off-vehicle hardware component has a second runtime environment for supporting the same computer program application on the off-vehicle hardware component. Moreover, the vehicle is provided with a selector that is configured to select either the in-vehicle or off-vehicle hardware for executing the computer program application, for example, depending on the hardware resources provided by the particular hardware.

According to a still further aspect of the invention, a method is provided for providing multimedia data in a motor vehicle, whereby the motor vehicle has an in-vehicle hardware component that provides a first runtime environment for supporting a computer program application on the in-vehicle hardware component. In this regard, the method has a step of providing an interface between the at least one in-vehicle hardware component and at least one off-vehicle hardware component, which provides a second runtime environment for supporting the computer program application on the off-vehicle hardware component. Further, the method comprises a step of executing the computer program application either on the in-vehicle or on the off-vehicle hardware component. The selection of the hardware component in this regard can occur, for example, based on the available hardware resources, such as, e.g., computing and/or memory capacity.

Exemplary embodiments of the present invention present an architecture for the production of a distributed infotainment system with the in-vehicle instance ICI (in-car infotainment) and the off-vehicle instance SM (smartphone or mobile device) and the Internet (or cloud). In this regard, all three instances involved can be executed as a server. Web browsers can run on all three instances. Individual programs (applications, widgets) can be executed based on a framework, such as, e.g., HTML5, on all three instances. The interface between the instances is clearly definable by a further framework, such as, e.g., JavaScript, and also assures a platform-independent executability.

Various protocol technologies can be used for exchanging information such as, e.g., WebSocket. It is likewise possible to exchange files, for example, music files, in this way.

As a result, an exemplary embodiment provide an infotainment system that can be configured in a number of respects. The costly computing capacity is often an obstacle in current IC's. Memory space, in contrast, can be increased relatively easily for the customer by consumer items (SD cards, USB sticks). The ICI of the invention or the in-vehicle hardware component can be dimensioned differently in regard to its hardware. A low-priced ICI, e.g., is poorly equipped and offers barely any storage options and/or computing capacity. Because of its limited hardware resources, only a few applications can be provided reliably on a simple ICI (for example, FM radio). Further applications, such as, e.g., a media player or navigation, can then be executed on a smartphone. A high-quality in-vehicle ICI, in contrast, has the prerequisites for executing many more applications itself and thereby reliably. If a user does not have his smartphone available, these applications can be executed on the in-vehicle ICI.

Exemplary embodiments enable the rapid development of new application software for the infotainment system. Standard tools can be used for development because of the defined interfaces and frameworks. It is also possible to define different classes of applications, such as, e.g., "safety-relevant," "access to vehicle data allowed," "only for the vehicle manufacturer," or "freely configurable" (for open source).

For example, the vehicle or distributed infotainment system can be configured via a vehicle manufacturer's online portal. Examples of this would be a music library or adjustment of the vehicle occupant seats via the online portal.

Exemplary embodiments of the present invention thus offer the possibility of exchanging both data and applications freely among the various in-vehicle and off-vehicle system components. A user may have stored a music library on the in-vehicle hardware but also in the cloud and/or on his smartphone. Exemplary embodiments of the present invention offer the possibility here of creating a playlist from all three instances: in-vehicle hardware (ICI), smartphone, and Internet cloud. If the Internet connection is broken, the files from the cloud are no longer available.

The long development times in the automotive sector, the high flexibility in configurability, and the utilization of consumer items can be decoupled from one another by the exemplary embodiments.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
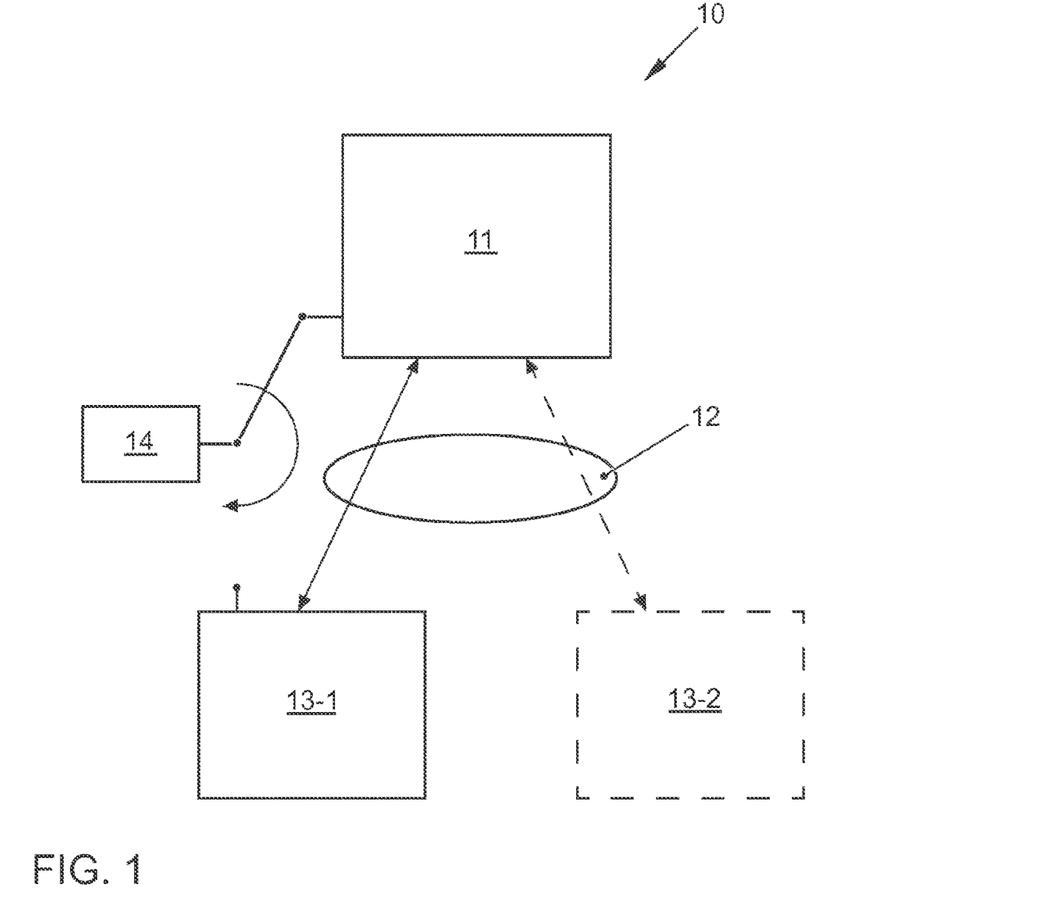
FIG. 1 shows a schematic block diagram of a device for providing multimedia data in a motor vehicle according to an exemplary embodiment of the present invention.

FIG. 1 shows a schematic block diagram of a device 10 for providing multimedia data and/or applications in a motor vehicle.

The device 10 has at least one in-vehicle hardware or system component 11 for providing a first runtime environment for supporting at least one computer program application on the in-vehicle hardware component. Further, device 10 comprises an interface 12 to at least one off-vehicle hardware or system component 13, which provides a second runtime environment for supporting the computer program application on the at least one off-vehicle hardware component 13. By way of example, in FIG. 1 two off-vehicle hardware components 13-1 and 13-2 are coupled to in-vehicle hardware component 11 via the respective interfaces 12. In-vehicle hardware component 11 and the two off-vehicle hardware components 13-1 and 13-2 together form a distributed infotainment system, similar to a so-called cloud computing network. Further, a selector 14 is provided, which is configured to select either in-vehicle hardware component 11 or one of the off-vehicle hardware components 13-1, 13-2 for executing the computer program application. The computing and/or memory load for the computer program application can therefore be created either in-vehicle or off-vehicle. A result of the computer program application can be utilized in-vehicle independently of this.

The various hardware components 11, 13-1, 13-2 can each have a processor and/or a data memory such as, e.g., a flash memory. Further, hardware components 11, 13-1, and 13-2 can also comprise display devices or displays to be able to playback multimedia contents audiovisually. In-vehicle hardware component 11 of the distributed infotainment system can be permanently installed in the motor vehicle and is therefore also called in-car infotainment component 11 (ICI) below. Off-vehicle hardware component 13-1, for example, can be a portable device such as, e.g., a mobile telephone with computer functionality (smartphone). The other off-vehicle hardware-component 13-2 can be a vehicle-remote Internet-capable hardware component such as, e.g., a web server of a computer network. Accordingly, off-vehicle hardware component 13-2 can offer, for example, access to a so-called cloud service, especially to a vehicle manufacturer-specific cloud service.

All hardware or system components 11, 13-1, 13-2 can be used as a platform for the computer program application, which can also be called an app or widget in everyday language. In other words, one and the same computer program application can run on each of the hardware components 11, 13-1, 13-2 of the distributed infotainment system, as in a distributed computer network. To this end, hardware components 11, 13-1, 13-2 each provide operating system-specific runtime environments for supporting the computer program application. For example, a first runtime environment mediates between the computer program application and a first operating system of in-vehicle hardware component 11; a second runtime environment mediates between the computer program application and a second operating system of off-vehicle hardware component 13-1; and a third runtime environment mediates between the computer program application and a third operating system of off-vehicle hardware component 13-2. In this regard, a runtime environment is understood to be a computer program that is executed together with the computer program application that cannot communicate directly with the operating system and makes it runnable, therefore executable, on the particular hardware component 11, 13-1, 13-2, by mediating between the application program or computer program application and the operating system. Prominent examples thereof are, e.g., Java runtime environments, in order to execute so-called Java applets.

An exemplary embodiment of the present invention therefore allows executing the computer program application (app) either on in-vehicle hardware 11 or off-vehicle hardware 13. To this end, the computer program application can be installed, for example, both on in-vehicle hardware 11 and off-vehicle hardware 13. The selector 14 can then only determine the hardware component on which the application is started and thereby executed. Whereas a first computer program application (e.g., FM radio) can be executed, for example, on in-vehicle hardware 11, a second computer program application (e.g., navigation) of the infotainment system can be executed on one of off-vehicle hardware components 13. The data generated by the second computer program application on external hardware 13 can then be transmitted via interface 12 to in-vehicle hardware 11, so that in-vehicle hardware 11 can display or playback the received data (e.g., navigation data). Whereas the first computer program application therefore can be, for example, a media player for audio and/or video data that is executed on in-vehicle infotainment hardware component 11, the second computer program application can be, for example, a navigation application that is executed by a smartphone, because the computing and/or memory capacities of the in-vehicle hardware are insufficient for this.

The selector 14 can therefore be configured, according to some exemplary embodiments, to select in-vehicle hardware component 11 for executing the computer program application, when the hardware resources of the in-vehicle hardware component are sufficient for executing the computer program application; otherwise one of the off-vehicle hardware components 13-1 or 13-2 can be selected. In general, the selection of the hardware by the selector 14 can also be carried out load-specific, so that all hardware components 11, 13-1, 13-2 are loaded approximately equally computationally (load balancing). In simple exemplary embodiments, the selection, however, can also be made only manually in the vehicle or in advance by an online service or web server. At the start of the distributed infotainment system, in-vehicle hardware component 11 can then be informed about the selection, for example, by means of a configuration file, transmitted from web server 13-2 via interface 12 to in-vehicle hardware 11. In other exemplary embodiments, however, the selection can also be made, for example, depending on the battery lifetime. In such exemplary embodiments, for example, with a weakening smartphone battery an infotainment application running on the smartphone can be ported to in-vehicle hardware 11. This porting or migration process can be carried out in simpler embodiments by stopping and restarting the application; in other embodiments the porting can also be done during the runtime of the application by process migration strategies.

A very flexible and scalable infotainment system, in which complex infotainment applications can also be executed when in-vehicle infotainment hardware 11 is only poorly equipped, can be provided by the proposed distributed system architecture. In this case, applications can be run in fact, instead of on in-vehicle hardware 11, on off-vehicle hardware 13 (e.g., smartphone, tablet PC, web server, etc.) and their results passed on to an output device of in-vehicle hardware 11 by means of interface 12. This flexible scalability due to the possibility of moving applications from one system component to another is made clear by the schematic diagram in FIG. 2.

Figure 2:
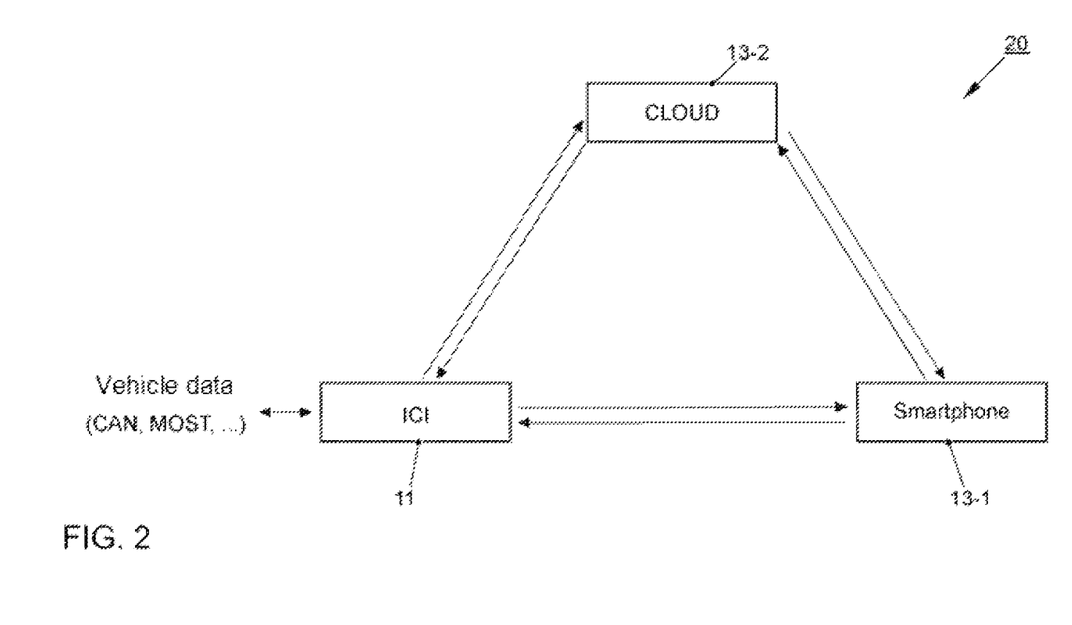
FIG. 2 shows a schematic diagram of a distributed infotainment system according to an exemplary embodiment of the present invention.

FIG. 2 shows distributed infotainment system 20, which can also be called an overall media aggregator system. Infotainment system 20 comprises, for example, the three already described components: the in-vehicle runtime environment or hardware 11 of the infotainment system (ICI), an off-vehicle smartphone component 13-1, and an off-vehicle server component (cloud service) 13-2. Tasks, such as, e.g., executing infotainment application programs, storing or providing data, etc., can be distributed freely among the individual system components 11, 13-1, and 13-2, as indicated by the double arrows. The distribution of such tasks in this case can be made, e.g., dependent on the computing and/or memory capacity available in the particular hardware component available. Infotainment system 20 therefore no longer comprises only one in-vehicle infotainment component 11, as before, but additional off-vehicle components (e.g., smartphone, cloud), whose hardware-resources are included in infotainment system 20 in such a way that it is irrelevant for a user on which hardware component now actually a specific infotainment application is executed. In other words, in the exemplary embodiments of the present invention, the user perhaps does not at all notice on which of hardware components 11, 13-1, 13-2 the application is now actually being executed. The results can be output independent of the platform via in-vehicle hardware 11.

Figure 3:
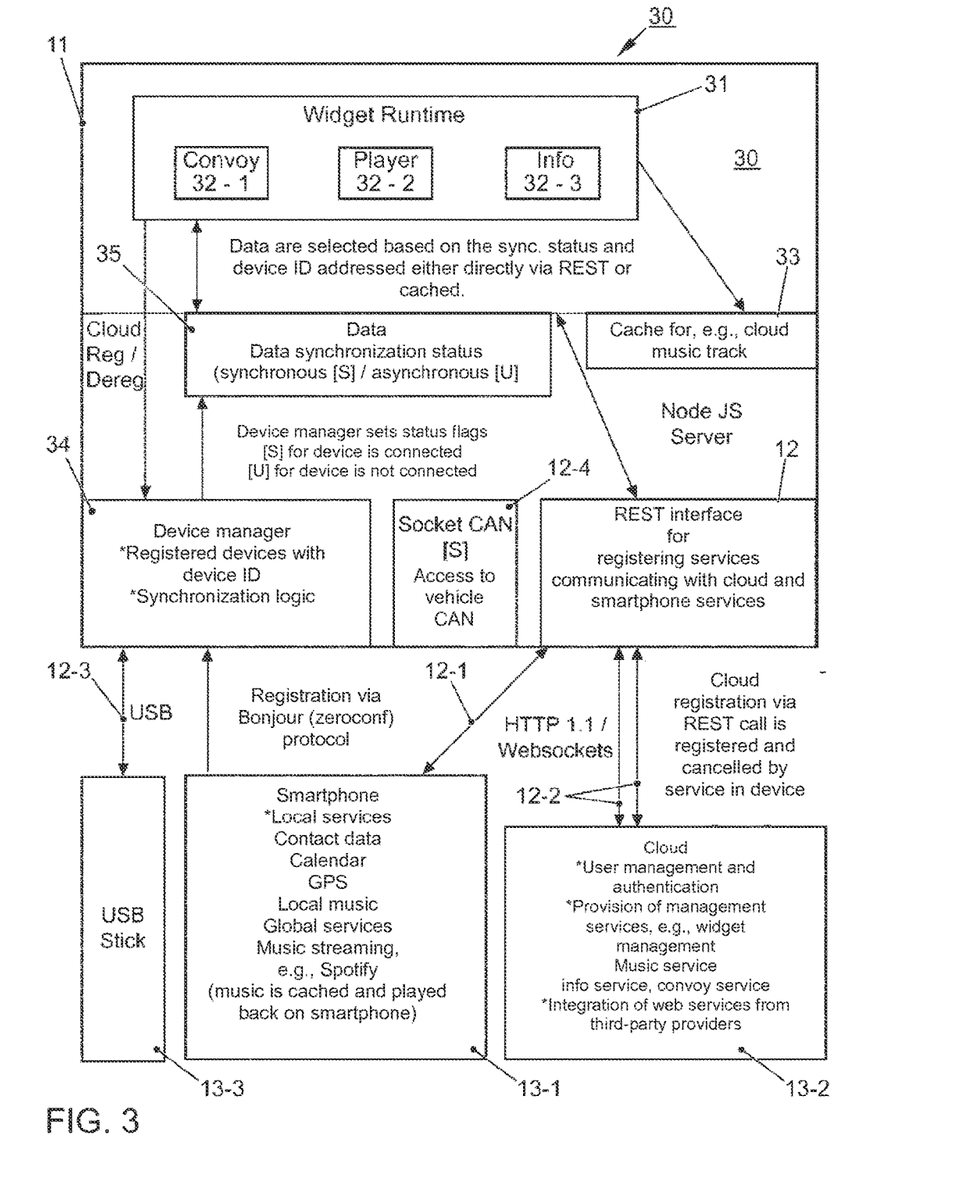
FIG. 3 shows a system architecture of a runtime environment of an in-vehicle infotainment hardware component with connection to an external data source, according to an exemplary embodiment of the present invention.

The runtime environment on in-vehicle hardware component 11 offers different functions, which are shown schematically in FIG. 3. The objectives in the depicted conceptualization of the system architecture, inter alia, were the use of current standards and the avoidance of proprietary solutions in order to assure expandability, maintainability, and platform independence. Further, use of the system should be as convenient as possible. In particular, to enable easy expandability, maintainability, and platform independence, standardized Internet protocols and technologies were relied upon in the conceptualization and development of the infotainment system.

FIG. 3 shows a distributed infotainment system 30 with in-vehicle component 11 and three exemplary off-vehicle components 13-1, 13-2, and 13-3. Whereas in-vehicle system component 11 is installed in the vehicle itself, off-vehicle component 13-1 can be a smartphone, off-vehicle component 13-2 can be an Internet cloud, and off-vehicle component 13-3 can be, for example, a USB stick (Universal Serial Bus). For example, local services such as contact data, calendar, GPS data/services, or local music can be provided via smartphone 13-1. Likewise, global services such as music streaming can be executed. For example, user management and authentication can occur via cloud component 13-2. Further, vehicle manufacturer-specific services can be provided in this way. In addition, the application programs, which are to be available in the distributed infotainment system, can be managed. For example, a music service, an info service, a convoy service, or an integration of other web services from third-party providers can be provided via cloud component 13-2. USB stick 13-3 can serve, for example, as an external storage medium for storing music, image, and/or video data, which can be accessed via corresponding interface 12-3 by in-vehicle system component 11. The convoy service enables the starting, participating in, and leaving of a vehicle convoy. The convoy app shows the "accessing" of different applications by the entire system. A vehicle A can initiate a convoy trip via an appropriate HMI (Human Machine Interface) by setting a destination via a navigation application and then inviting at least one other participant B from the address book. A vehicle B (C, D, . . . ) can be informed via an appropriate HMI that it has been invited to a convoy trip with vehicle A. The participation can be confirmed or refused. The destination is accepted and the navigation application of vehicle B calculates the route. The position of A (C, D, . . . ) appears dynamically in the navigation of B, and the position of B (C, D, . . . ) in the navigation of A. Each participant in the convoy can send messages (e.g., in text form) to the other participants (e.g., "take a break together at parking place XY").

A runtime environment for computer program applications (widget runtime) 31 is executed on in-vehicle hardware component 11. Runtime environment 31 is used as a mediation instance between computer program applications 32 and an operating system of hardware component 11. Computer program applications 32, so-called widgets, can be developed, e.g., by means of HTML5 (Hypertext Markup Language), JavaScript, and CSS3 (Cascading Style Sheets). According to exemplary embodiments, therefore, an application-specific computer program application is based on version 5 or higher versions of the text-based markup language HTML. HTML5 in this case is a combination of open standards for providing contents and functions for all types of devices. It is the future standard for the creation of websites and comprises the actual standard and additional standards and technologies, such as CSS3, JavaScript as the scripting language, and related standards, such as AJAX (Asynchronous JavaScript And XML) and JSON (JavaScript Object Notation). There are also other free standards, such as XML (Extensible Markup Language) and XHTML (Extensible HyperText Markup Language). These standards and technologies enable the development of a wide range of full-featured user interfaces.

According to an exemplary embodiment, different applications 32, in the form of so-called widgets, can therefore be synchronized on in-vehicle ICI 11. Said widgets 32 can provide the user with a certain functionality of the infotainment system. The widgets "Convoy," "Player," and "Info" are mentioned by way of example in FIG. 3. Widgets 32 for communicating with external hardware components 13 can access data from cloud 13-2, smartphone 13-1, connected USB media 13-3, or the vehicle CAN (Controller Area Network) via defined interfaces 12, which can be based on the Representational State Transfer (REST) paradigm and can use standardized protocols such as, e.g., HTTP or WebSocket. Interfaces 12 can be provided by runtime environment 31 or external device/service 13 (smartphone 13-1, cloud service 13-2). According to exemplary embodiments, an interface 12 can therefore be provided by first runtime environment 31 and the at least one off-vehicle hardware component 13 and/or the second runtime environment. In this regard, interfaces 12 can be based on the REST programming paradigm and at least one standardized network protocol, particularly HTTP and/or WebSocket. Basically REST describes the idea that a URL (Uniform Resource Locator) represents precisely one page content as the result of a server-side action, as the Internet standard HTTP already provides for static content. REST is characterized in that a communication occurs on call. The use of the WebSocket protocol to maintain communication links can also be advantageous when there is no call. The time for establishing communication can be minimized by this. A client is active and requests a representation of a resource from a passive server or modifies a resource. Resources, the objects of an application, have a URI (Uniform Resource Identifier) assigned to them, with which they can be addressed. A representation of a resource can be requested as a document from the client. Representations of resources can refer to other resources, which in turn again provide representations, which in turn can refer to resources. A server does not track the client status. Each request to the server must contain all information necessary for interpreting the request. Caches (buffer memory) are supported. A server can label its response as cacheable or uncacheable.

Depending on the particular application, data can be synchronized with in-vehicle ICI 11 and be stored persistently there in order to be able to use them further offline as well, i.e., without a connection to smartphone 13-1 or to cloud 13-2. The synchronization of the data depends on the particular application. Therefore, it is the task of the particular widget 32, which can implement a business logic of a client function, to decide whether the data is to be used in an off-line mode or not. According to some exemplary embodiments, infotainment device 10 therefore can have an in-vehicle data memory 33, to copy multimedia data and/or application data from off-vehicle hardware component 13 into in-vehicle data memory 33, in the absence of connectivity between in-vehicle and off-vehicle hardware components 11, 13. If data from external sources 13 are used and these are to be synchronized with ICI 11, thus it can be advantageous to detect the status of the synchronization and to enter it in a local ICI database 35. This is, for example, a task for device management component 34.

External devices 13 coupled to ICI 11 via interfaces 12 can be managed by device management component 34 of in-vehicle hardware 11. Infotainment device 10 can therefore be configured to detect and/or to manage off-vehicle hardware components 13 coupled via interface 12 to in-vehicle hardware component 11. In this case, for example, a smartphone 131 can log automatically onto device manager 34 after a startup of the application software on the smartphone. This can occur, for example, by means of the known Bonjour protocol. Bonjour in this case is a technique that provides the automatic detection of network services in IP networks (Internet protocol). It is an implementation of the so-called zeroconf or zero-configuration networking system for configuring computer networks without human intervention. Device manager 34 can register USB devices 13-3 connected additionally and whether there is an Internet connection or connection to cloud service 13-2. This can occur, for example, by a REST GET request to cloud service 13-2. A deregistration of external hardware components 13 can accordingly also occur again by means of Bonjour or via a service that receives an unsuccessful REST GET request. Device manager 34 can notify the database 35 about the current registration or synchronization status of an external device 13.

Synchronized data and unsynchronized data can be differentiated. In the case of synchronized data, device 13 containing the data is also available during the runtime of application 32. For example, a music player from a streaming service can only play music tracks, if it or the external device that plays the streamed music is accessible. Unsynchronized data are data that were read at some time into internal memory 35, but device 13 from which they originated is no longer available specifically during the runtime of application 32. This situation is interesting, for example, for calendar data, because they can be used even if they are not current. By means of this differentiation, it is possible for the particular services to decide whether they still want to use the data or not.

The applications or widgets 32 based on the synchronization status of the data and a device ID can select the required data from internal database 35. Widgets 32, for example, can request cloud service 13/2 via REST interface 12 and in the case of accessibility/inaccessibility register or deregister it with device manager 34. Via the REST interface and an unsuccessful REST GET request, applications 32 detect if, for example, cloud service 13-2 is no longer available. Widgets 32 can therefore manage independently synchronization flags, for example, for cloud service 13-2. Accordingly, even when an external device 13 is not accessed, the widgets can inform device manager 34 of the current status of external device 13.

Off-vehicle cloud component 13-2, i.e., the cloud service, according to some exemplary embodiments, can serve as a central instance of distributed infotainment system 30 and can be used for functions for user authentication, management of user information, and for configuration of the employed applications 32 and ICI settings. Online service 13-2 can provide a user interface over which a user can make the necessary settings for the infotainment system and can manage the employed widgets 32 and services. As a result, the user is enabled, for example, to personalize the distributed infotainment system. Within the scope of such exemplary embodiments, device 10 can be configured to receive via interface 12 a configuration setting from off-vehicle component 13-2, whereby the configuration setting can comprise information on the at least one computer program application 32 to be executed and/or multimedia data to be played back.

Figure 4:
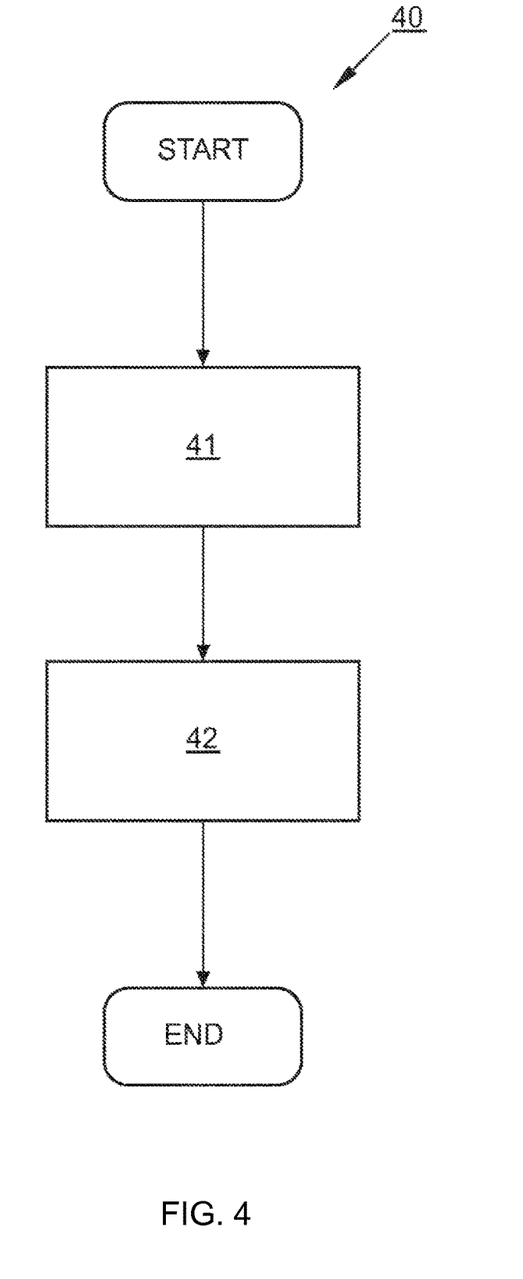
FIG. 4 shows a schematic flowchart of a method according to an exemplary embodiment of the present invention.

A method 40 for providing multimedia data in a motor vehicle according to an exemplary embodiment of the present invention will now be described with use of FIG. 4. The motor vehicle has an in-vehicle hardware component 11, which provides a first runtime environment 31 for supporting at least one computer program application 32 on in-vehicle hardware component (ICI) 11.

Method 40 comprises a first step 41 of providing an interface 12 between the at least one in-vehicle hardware or system component 11 and at least one off-vehicle hardware or system component 13-1, 13-2, 13-3, which provides a second runtime environment for supporting the at least one computer program application 32 on off-vehicle hardware component 13. Further, method 40 comprises a second step 42 of executing the at least one computer program application 32 either on in-vehicle hardware component 11 or on off-vehicle hardware component 13.

Exemplary embodiments of the present invention therefore provide a distributed infotainment system, in which based on recent networking technologies, such as, e.g., LTE (Long Term Evolution), Bluetooth, WLAN (Wireless Local Area Network), in the motor vehicle (ICI) or outside the motor vehicle (smartphone, Internet cloud, or online services) essential infotainment components are connected or coupled together in order to be able to improve multimedia variety, convenience, and safety in the motor vehicle.

For example, audio data are available today on different distribution channels (for example, CD, download, etc.) and thus very large libraries quickly result, which are distributed, however, on CDs, smartphones, home PCs, or USB sticks. With the exemplary embodiments of the present invention, such libraries can be merged in the motor vehicle. It is more convenient (and safer), however, to create playlists on a home PC rather than in the vehicle. Nonetheless, thus created playlists can be used in the vehicle and the music library there can also be always up-to-date.

For convenience it is conceivable to make so-called PIM (Personal Information Management) data (such as, e.g., calendar entries, contacts, etc.) available always up-to-date in the motor vehicle.

In terms of safety, e.g., current weather data, traffic reports, information on parking situations, etc., can be presented bundled.

With the exemplary embodiments, a stationary (home PC), portable (smartphone), and mobile (ICI) overall infotainment system thus results in which data from all distributed components can be brought together or aggregated. The system is capable of allowing applications to run on various hardware components and is moreover easy to expand. The exemplary embodiments therefore provide an infotainment system comprising an Internet-based component, a smartphone-based component, and the in-vehicle ICI as well as corresponding interfaces, which enables access to the aggregated data.

The features disclosed in the above description, the following claims, and the accompanying figures can be relevant and implemented both individually and also in any combination for the realization of an exemplary embodiment in its various forms.

Although some aspects were described in relation to a device, it is understood that these aspects also represent a description of the corresponding method, so that a block or component of a device is also to be understood as a corresponding method step or as a feature of a method step. Analogously, aspects, described in relation to one or as one method step, also represent a description of a corresponding block or detail or feature of a corresponding device.

Depending on the specific implementation requirements, exemplary embodiments of the invention can be implemented in hardware or in software. The implementation can be carried out with use of a digital storage medium, for example, a floppy disk, DVD, Blu-ray disc, CD, ROM, PROM, EPROM, EEPROM, or a FLASH memory, hard drive, or some other magnetic or optical memory, on which electronically readable control signals are stored, which can or do work together with a programmable hardware component such that the particular method or individual steps thereof are carried out.

A programmable hardware component can be formed by a processor, a computer processor (CPU=Central Processing Unit), a graphics processor (GPU=Graphics Processing Unit), a computer, a computer system, an application-specific integrated circuit (ASIC=Application-Specific Integrated Circuit), an integrated circuit (IC=Integrated Circuit), a one-chip system (SOC=System on Chip), a programmable logic element, or a field programmable gate array with a microprocessor (FPGA=Field Programmable Gate Array).

The digital storage medium can therefore be machine- or computer-readable. Some exemplary embodiments therefore comprise a data carrier, which has electronically readable control signals, capable of working together with a programmable computer system or a programmable hardware component such that one of the methods described herein is carried out. An exemplary embodiment therefore is a data carrier (or a digital storage medium or a computer-readable medium) on which the program for carrying out the method described herein is recorded.

In general, exemplary embodiments of the present invention can be implemented as a program, firmware, computer program, or computer program product with a program code or as data, whereby the program code or the data are effective for carrying out one of the methods when the program runs on a processor or a programmable hardware component. The program code or data can also be stored, for example, on a machine-readable medium or data carrier. The program code or data can be present, inter alia, as source code, machine code, or bytecode, as well as another intermediate code.

A further exemplary embodiment, moreover, is a data stream, a signal sequence, or a sequence of signals, which represents or represent the program for carrying out one of the methods described herein. The data stream, signal sequence, or sequence of signals can be configured, for example, to be transferred via a data communications link, for example, over the Internet or another network. Exemplary embodiments are thus also signal sequences representing data, suitable for transmission over a network or a data communications link, whereby the data represent the program.

A program according to one exemplary embodiment can implement one of the methods during its execution, for example, in that it reads out memory locations or writes a datum or a plurality of data in it, as a result of which switching processes or other processes are optionally caused to occur in transistor structures, in amplifier structures, or other electrical, optical, or magnetic components or components operating according to another functional principle. Accordingly, data, values, sensor readings, or other information can be collected, determined, or measured by a program by reading of a memory location. A program can therefore collect, determine, or measure variables, values, measured values, or other information by reading one or more memory locations, as well as by writing in one or more memory locations, bring about, lead to, or carry out an action, as well as control other devices, machines, and components.

The above-described exemplary embodiments represent only one illustration of the principles of the present invention. It is understood that modifications and variations of the configurations described herein and details will be apparent to other skilled persons. For this reason, it is intended that the invention be limited only by the scope of protection of the following claims and not by the specific details, presented herein by means of the description and explanation of the exemplary embodiments.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An infotainment system device for providing multimedia data included in a motor vehicle, the device comprising:
    at least one in-vehicle hardware component providing a first runtime environment to support execution of at least one computer program application on the in-vehicle hardware component, wherein the at least one in-vehicle hardware component comprises a processor and/or a data memory of the infotainment system of the motor vehicle;
    an interface to at least one off-vehicle hardware component that provides a second runtime environment to support execution of the at least one computer program application on the off-vehicle hardware component; and
    a selector that selects either the in-vehicle hardware component or the off-vehicle hardware component to execute the at least one computer program application,
    wherein the selector is configured to determine a battery life of the off-vehicle hardware component, and, based on that determined battery life, select the in-vehicle hardware component to run the at least one computer program application in response to a further determination that hardware resources of the at least one in-vehicle hardware component are sufficient for executing the at least one computer program application and, otherwise, select the off-vehicle hardware component to run the at least one computer program application provided the battery life of the off-vehicle hardware component is sufficient to run the at least one computer program application, and
    wherein, in response to the selection of the off-vehicle hardware component to execute the at least one computer program application, the interface is configured to transmit result data generated by the at least one computer program application running on the off-vehicle hardware component to the in-vehicle hardware component so that the generated data is output via the infotainment system device via the in-vehicle hardware component.

2. The device according to claim 1, wherein the first runtime environment mediates between the at least one computer program application and a first operating system of the at least one in-vehicle hardware component, and wherein the second runtime environment mediates between the at least one computer program application and a second operating system of the off-vehicle hardware component.

3. The device according to claim 1, wherein the at least one computer program application is based on version 5 or higher versions of the text-based markup language HTML.

4. The device according to claim 1, wherein the at least one off-vehicle hardware component comprises a portable device with at least one processor and a data memory for executing the at least one computer program application, a laptop computer, or smartphone.

5. The device according to claim 1, wherein the at least one off-vehicle hardware component comprises an off-vehicle web server configured to access data provided by the web server or applications of an Internet service via the interface.

6. The device according to claim 1, wherein the device is configured to receive a configuration setting from the off-vehicle hardware component via the interface, and wherein the configuration setting comprises information for the at least one computer program application to be executed and/or multimedia data to be output on the at least one in-vehicle hardware component.

7. The device according to claim 1, wherein the interface is provided by the first runtime environment and the at least one off-vehicle hardware component and/or by the second runtime environment.

8. The device according to claim 1, wherein the interface is based on a Representational State Transfer (REST) programming paradigm and at least one standardized network protocol, HTTP and/or a WebSocket.

9. The device according to claim 1, further comprising an in-vehicle data memory to copy multimedia data and/or one or more computer program applications from the off-vehicle hardware component into the in-vehicle data memory in an event of a lack of connectivity between the in-vehicle hardware component and the off-vehicle hardware component.

10. A motor vehicle comprising a device according to claim 1.

11. A method for providing multimedia data via an infotainment system device in a motor vehicle that has an in-vehicle hardware component which provides a first runtime environment to support execution of at least one computer program application on the in-vehicle hardware component, wherein the at least one in-vehicle hardware component comprises a processor and/or a data memory of the infotainment system of the motor vehicle, the method comprising:
    providing an interface between the in-vehicle hardware component and at least one off-vehicle hardware component, which provides a second runtime environment to support execution of the at least one computer program application on the off-vehicle hardware component; and
    selecting either the in-vehicle hardware component or the off-vehicle hardware component to execute the at least one computer program application; and
    in response to the selection, executing the computer program application either on the in-vehicle hardware component or on the off-vehicle hardware component,
    wherein the selector is configured to determine a battery life of the off-vehicle hardware component, and based on that determined battery life, select the in-vehicle hardware component to run the at least one computer program application in response to a further determination that hardware resources of the at least one in-vehicle hardware component are sufficient for executing the at least one computer program application and, otherwise, select the off-vehicle hardware component to run the at least one computer program application provided the battery life of the off-vehicle hardware component is sufficient to run the at least one computer program application, and
    wherein, in response to the selection of the off-vehicle hardware component to execute the at least one computer program application, the interface is configured to transmit result data generated by the at least one computer program application running on the off-vehicle hardware component to the in-vehicle hardware component so that the generated data is output via the infotainment system device via the in-vehicle hardware component.

12. A computer program, stored on a non-transitory, digital storage medium, for carrying out a method for providing multimedia data via an infotainment system device in a motor vehicle that has an in-vehicle hardware component which provides a first runtime environment to support execution of at least one computer program application on the in-vehicle hardware component, wherein the at least one in-vehicle hardware component comprises a processor and/or a data memory of the infotainment system of the motor vehicle, the method comprising:

providing an interface between the in-vehicle hardware component and at least one off-vehicle hardware component, which provides a second runtime environment to support execution of the at least one computer program application on the off-vehicle hardware component; and     selecting either the in-vehicle hardware component or the off-vehicle hardware component to execute the at least one computer program application; and     in response to the selection, executing the computer program application either on the in-vehicle hardware component or on the off-vehicle hardware component,     wherein the selector is configured to determine a battery life of the off-vehicle hardware component, and based on that determined battery life, select the in-vehicle hardware component to run the at least one computer program application in response to a determination that hardware resources of the at least one in-vehicle hardware component are sufficient for executing the at least one computer program application and, otherwise, select the off-vehicle hardware component to run the at least one computer program application, provided the battery life of the off-vehicle hardware component is sufficient to run the at least one computer program application, and     wherein, in response to the selection of the off-vehicle hardware component to execute the at least one computer program application, the interface is configured to transmit data generated by the at least one computer program application running on the off-vehicle hardware component to the in-vehicle hardware component so that the generated data is output via the infotainment system device via the in-vehicle hardware component.

13. The method of claim 11, wherein the first runtime environment mediates between the at least one computer program application and a first operating system of the at least one in-vehicle hardware component, and wherein the second runtime environment mediates between the at least one computer program application and a second operating system of the off-vehicle hardware component.

14. The method of claim 11, wherein the at least one computer program application is based on version 5 or higher versions of the text-based markup language HTML.

15. The method of claim 11, wherein the at least one off-vehicle hardware component comprises a portable device with at least one processor and a data memory for executing the at least one computer program application, a laptop computer, or smartphone.

16. The method of claim 11, wherein the at least one off-vehicle hardware component comprises an off-vehicle web server configured to access data provided by the web server or applications of an Internet service via the interface.

17. The method of claim 11, wherein the device is configured to receive a configuration setting from the off-vehicle hardware component via the interface, and wherein the configuration setting comprises information for the at least one computer program application to be executed and/or multimedia data to be output on the at least one in-vehicle hardware component.

18. The method of claim 11, wherein the interface is provided by the first runtime environment and the at least one off-vehicle hardware component and/or by the second runtime environment.

19. The method of claim 11, wherein the interface is based on a Representational State Transfer (REST) programming paradigm and at least one standardized network protocol, HTTP and/or a WebSocket.

20. The method of claim 11, further comprising copying multimedia data and/or one or more computer program applications to an in-vehicle data memory from the off-vehicle hardware component into the in-vehicle data memory in an event of a lack of connectivity between the in-vehicle hardware component and the off-vehicle hardware component.

\* \* \* \* \*